INVENTOR.
RAYMOND L. SOUTHERN
BY
AGENT

Aug. 14, 1956 R. L. SOUTHERN 2,759,034
METAL ELECTRODE CLOSING DEVICE FOR MELTING CRUCIBLES
Filed Aug. 15, 1955 3 Sheets-Sheet 2

INVENTOR.
RAYMOND L. SOUTHERN
BY

AGENT

Aug. 14, 1956  R. L. SOUTHERN  2,759,034
METAL ELECTRODE CLOSING DEVICE FOR MELTING CRUCIBLES
Filed Aug. 15, 1955  3 Sheets-Sheet 3

INVENTOR.
RAYMOND L. SOUTHERN
BY
AGENT

United States Patent Office 2,759,034
Patented Aug. 14, 1956

2,759,034

METAL ELECTRODE CLOSING DEVICE FOR MELTING CRUCIBLES

Raymond L. Southern, New Kensington, Pa., assignor to Titanium Metals Corporation of America, Pittsburgh, Pa., a corporation of Pennsylvania Application August 15, 1955, Serial No. 528,219

8 Claims. (Cl. 13—18)

This invention relates to the arc melting of metals, including for example steel, alloy steel and the so-called refractory metals, titanium and zirconium. More particularly it relates to apparatus in which a consumable electrode of such metal is melted into an ingot which is then employed as the consumable electrode in a subsequent remelting operation. The original electrode is often fabricated of sintered or pressed particles of metal such as the sponge titanium produced by the so-called Kroll process. Remelting steps are often desirable when the first melted ingot is not completely homogeneous, for instance, if it would be formed by melting a plurality of smaller electrodes of the original metal.

Various devices have been proposed for attaching consumable electrodes to actuating means by which their vertical movement inside the melting crucible is controlled. Initial arcing is accomplished with the bottom of the electrode close to the bottom of the crucible and as the electrode metal is melted to form the ingot in the crucible, the electrode is gradually lowered so as to maintain a constant space relationship between the bottom surface of the electrode and the pool of molten metal in the crucible. It is generally desirable that ingots of metal be of substantial weight and they may often weigh up to several hundred pounds or even a ton or more. The electrode attachment must therefore be secure and rigid and involves careful design. It must act to transfer electric current to the electrode and also must be of such mechanical design as to maintain the electrode in vertical alignment so that the correct space relationship is maintained between it and the walls of the crucible. Inasmuch as the electrode is consumed in the melting operation, the electrode holder attachment should not extend over more of the length of the electrode than is necessary to obtain proper mounting.

In simple melting operations the holder of the consumable electrodes can be arranged employing suitable holding apparatus such as clamps or the like with, as explained above, proper care in setting the electrode to insure safe and rigid mounting as well as proper alignment. However, in melting and remelting operations the problem becomes more aggravated due to differences in diameter, surface, and physical characteristics between the original pressed or sintered metal electrode and the melted ingot electrode. Clamping devices which are suitable for attachment to pressed or sintered bodies cannot ordinarily be readily adapted to hold to the solid, dense and comparatively smooth surface of an ingot electrode.

It is therefore the object of this invention to provide means for melting and remelting consumable electrodes of a refractory metal in an arc furnace.

A further object of this invention is to provide a device for attaching consumable electrodes to actuating means therefor in an electric arc furnace.

A still further object of this invention is to provide a device which will simplify melting and remelting operations in consumable electrode arc melting processes.

Yet another object to the invention is to provide a device which will function initially as the bottom closure in a consumable electrode arc furnace crucible and will also function as an electrode holder when the originally formed ingot is employed as an electrode in a subsequent remelting operation.

These and other objects of the invention will become apparent from the following complete description and from the annexed drawings in which.

Figure 1:
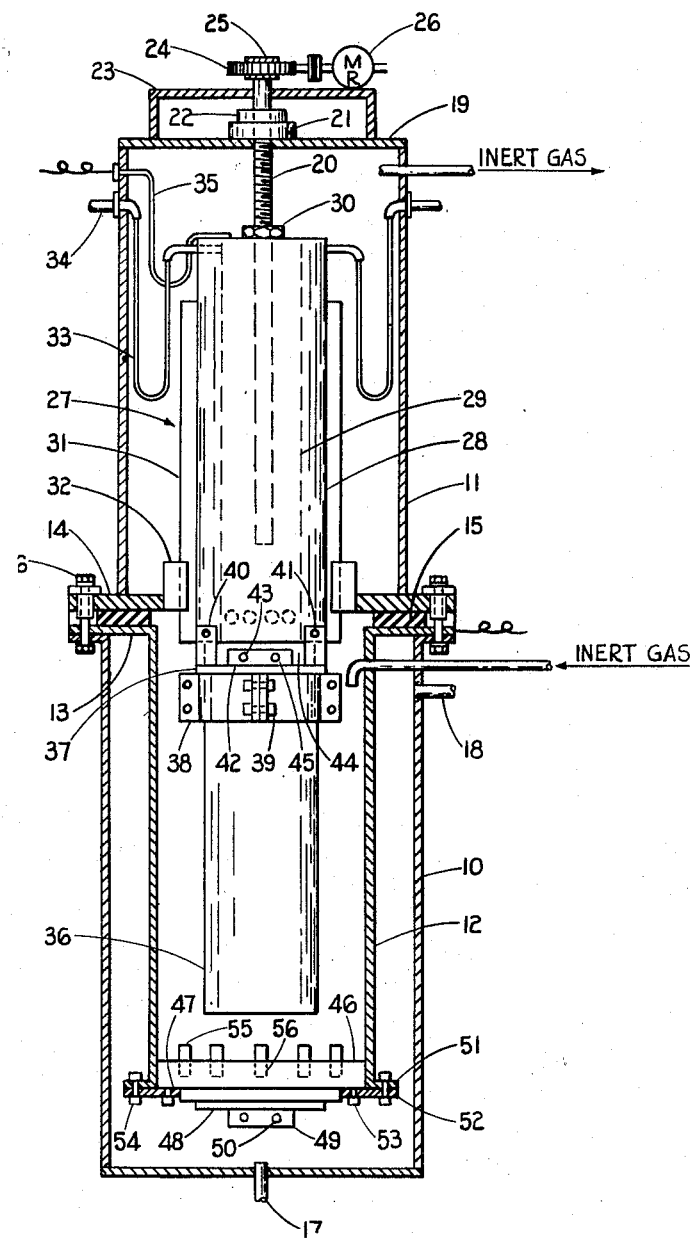
Fig. 1 shows a general, broken out, view of a consumable electrode arc furnace employing the device of this invention.
Figure 2:
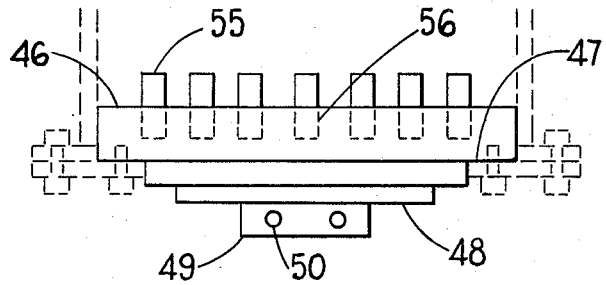
Fig. 2 shows a more detailed front view of the melting crucible closure.
Figure 3:
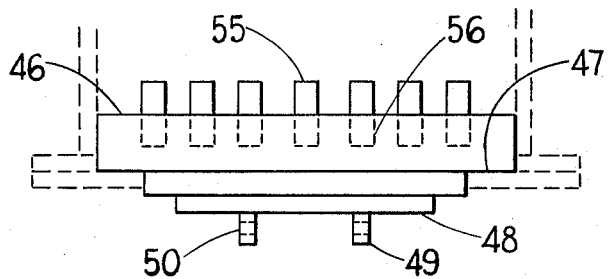
Fig. 3 shows a side view of the device of Fig. 2.
Figure 4:
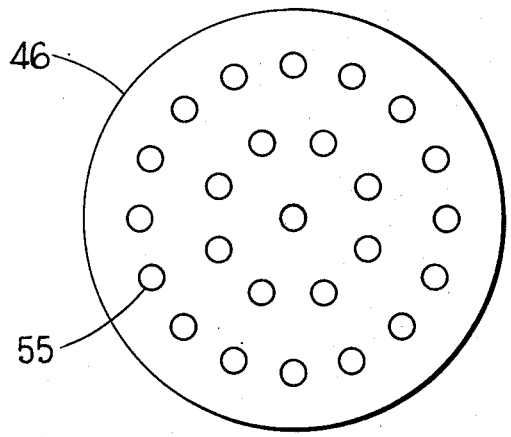
Fig. 4 shows a top view of the device of Fig. 2.

Referring now particularly to Fig. 1 the melting furnace comprises an outer steel jacket generally formed of a lower section 10 and upper section 11, the lower section 10 containing a cylindrical copper melting crucible 12 which is flanged at the top as at 13. The bottom of the upper jacket section 11 is also flanged as at 14 and between the flanges 14 and 13 a layer of insulation 15 is placed, and the section securely fastened together as by means of insulated bolts 16. The lower section 10 is supplied with water inlet means 17 and water outlet means 18; the space between the walls of the section 10 and the crucible 12 forming a water cooling jacket. Furnace section 11 houses the electrode actuating mechanism. The top of furnace section 11 is enclosed by a heavy plate member 19 through which passes vertical shaft 20 which is threaded for the portion of its length extending below plate 19. A collar member 21 is arranged where shaft 20 passes through plate 19 and superposed on this is thrust washer 22. A housing 23 is carried by the plate 19 being disposed to enclose a portion of the shaft 20, the collar member 21 and washer 22. The upper end of the shaft 20 external of the housing 23 is provided with spur and worm gears 24 and 25 which are disposed to be actuated by motor reducer 26. The weight of the electrode is supported and its movement is controlled by elongated support member 27. This member is composed of an outer steel tube 28 and is provided internally with a concentric copper pipe 29 which is perforated near the bottom. The upper extremity of member 27 is provided with a centrally disposed orifice about which a threaded nut 30 is fixedly secured for engaging the threaded portion of shaft 20 which extends downwardly into the member 27. Two opposite outer surfaces of member 27 are provided with vertically extending guide ridges 31 disposed in spaced relation thereabout to engage and track in corresponding spaced guide members 32 which extend upwardly from the juncture of the bottom of the upper furnace section 11 and the top of lower section 10.

Flexible hose connections 33 are arranged between one of the connections 34 and the interior of electrode holder 27 for communicating with the annular space between pipe 29 and the jacket 28 and between another of the connections 34 and the interior of pipe 29 so that water may be circulated inside the electrode holder 27 for cooling. The copper pipe 29 also serves as an electrical conductor being connected to the copper bottom closure plate of jacket 28 and at the top to a power supply through flexible copper connector 35.

A pressed sponge metal electrode of, for instance, titanium is shown at 36. It is attached to the electrode supporting member 27 by electrode attaching means which comprise a horizontal plate 37 from which depend clamp members 38 which securely hold the uppermost portion of the electrode 36 when they are tensioned together by tightening the bolts 39. Extending upwardly from plate 37 are steel load carrying bars 40 which are attached to the plate 37 as by bolts not shown and are firmly attached to the steel shell of the electrode holder 27 as by bolts 41. Electrical connection and additional attachment is provided by upwardly extending ears 42 which are attached to plate 37 and which are provided with holes 43 which are adapted to align with holes in a depending copper block 44 formed as part of the bottom of member 27 and electrically connected to pipe 29. Bolts 45 pass through the holes in the electrode holding ears and the supporting member block to maintain the electrode in its holder in rigid alignment and good electrical connection with the supporting member.

The bottom of the crucible 12 is closed by closure means such as a plug 46 which in the embodiment shown is of copper in the form of a relatively thick plate of circumference to fit inside the walls of crucible 12 and with its side edges notched as at 47. Depending from the undersurface of plug 46 is block 48 and from that two ears 49 which are provided with holes 50 spaced apart in the same manner as holes in block 44 in the electrode attaching device affixed to the electrode supporting member 27. The bottom of the crucible 12 is provided with outwardly extending flange 51. The closure plug 46 is sealed to the bottom of crucible 12 by provision of collar 52 which is bolted to plug 46 by bolts 53 and bolted to the flange 51 by other bolts 54. At least a portion of the upper surface of plug 46 is fabricated of the metal being melted in the furnace and which comprises the electrode 36. This is accomplished, in the embodiment illustrated, by provision of a number of vertical projecting pins 55 which are fixedly attached in spaced relation to one another to the top of plug 46 by providing their lower ends with threads as at 56 which are firmly inserted in threaded holes in the plug 46.

In operation, for example when melting titanium, it is preferable to first place between the spaced projecting pins 55 some loose particles of the metal to be melted. The furnace is then sealed and preferably flooded with inert gas and the electrode 36 is lowered until an arc is struck between the metal at the bottom of the crucible 12 and the bottom of the electrode 36. The electrode is maintained in proper spaced relationship with the bottom of the crucible and electric current is supplied thereto so that the metal of the bottom face of the electrode 36 will be melted and form a solid ingot in the crucible 12. Due to the fact that the pins 55 are of the same metal as the electrode 36, the initially melted metal of the electrode will weld autogeneously to these pins so that the bottom of the ingot will be fixedly attached to the plug 46 by action of the pins 55 the tops of which now became an integral part of the ingot and the bottoms remain still firmly fixed in the closure plug 46. After the melt is complete the furnace is opened preferably by lowering the bottom section 10, removing the crucible 12, and the ingot is removed with the bottom closure device from the crucible.

Figure 5:
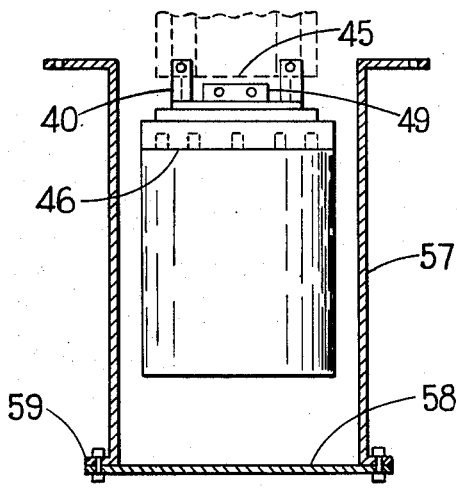
Fig. 5 illustrates the manner in which the original ingot with holding means attached is employed as the consumable electrode in a subsequent remelting operation.

The so formed ingot is next employed as the consumable electrode in a remelting operation as more particularly illustrated in Fig. 5. The original crucible bottom closure plug now functions as the electrode holder means. The ingot with plug attached is upended and the ears 49 are attached to block 45 and members 40 are firmly bolted in place so that the ingot electrode is arranged in substantially the same position as the electrode in the initial melting operation.

Inasmuch as the consumable electrode in an arc furnace must be spaced apart from the walls of the crucible in which it is melted, the diameter of the ingot electrode will be somewhat greater than the diameter of the original metal electrode. Therefore a second melting crucible 57 is employed for the remelting operation which is of proper diameter to match the extended dimensions of the ingot electrode. Crucible 57 may be closed at the bottom by any suitable means for instance flat plate 58 which is simply bolted on to the crucible flange 59.

Melting of the ingot electrode proceeds according to known methods and the electrode will be consumed and remelted into a new ingot contained in the crucible 57. There remains, however, attached to the electrode holding device a short stub of unmelted electrode 60 for the reason that it is not possible or desirable to carry the melting operation too close to the electrode holding supporting and actuating mechanism. Operations in which a stub of metal remains is a normal procedure in consumable arc melting processes.

Figure 6:
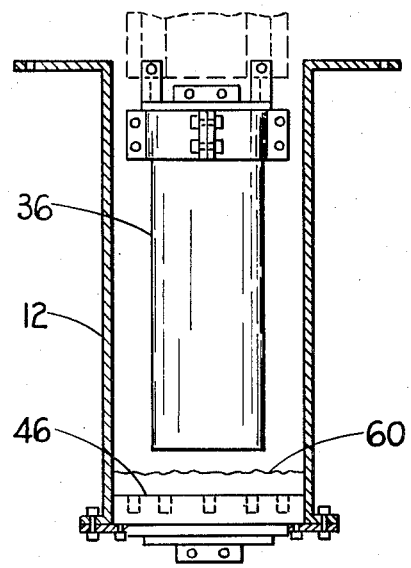
Fig. 6 illustrates the manner in which the electrode holding device illustrated in Fig. 5 again becomes the crucible bottom closure for another initial melting operation.

The electrode holding device with attached and integral stub 60 may then be employed as the bottom closing means for a crucible employed in another initial melt of a pressed metal electrode as shown more particularly in Fig. 6. The upper surface of the plug 46 by reason of the attached stub of titanium metal is again autogeneously welded to the bottom of the ingot when the melting operation is initiated and when the electrode is consumed to form another ingot. This ingot may then be employed as the electrode in the subsequent remelting step as previously described.

This application is a continuation-in-part of my application Ser. 362,592 filed June 18, 1953, and now abandoned.

I claim:

1. A device for initially closing the bottom of a crucible in an arc furnace for melting metallic consumable electrodes and acting as an electrode holder in a subsequent remelting operation comprising, a plug adapted to close the bottom of a crucible, an upper surface portion of said plug being composed of the metal to be melted and electrode holder attaching means on the under side of said plug.

2. A device for initially closing the bottom of a crucible in an arc furnace for melting metallic consumable electrodes and acting as an electrode holder in a subsequent remelting operation comprising, a plug adapted to close the bottom of a crucible, a series of pins of the metal to be melted projecting from the upper surface of said plug, and electrode holder attaching means on the under side of said plug.

3. A device for initially closing the bottom of a crucible in an arc furnace for melting metallic consumable electrodes and acting as an electrode holder in a subsequent remelting operation comprising, a plug adapted to close the bottom of a crucible, a plurality of pins of the metal to be melted being carried in spaced relation to one another by said plug, said pins projecting outwardly from the upper surface of said plug, and electrode holder attaching means on the under side of said plug.

4. A device for initially closing the bottom of a crucible in an arc furnace for melting metallic consumable electrodes and acting as an electrode holder in a subsequent remelting operation comprising a plug adapted to close the bottom of a crucible, a series of pins of the metal to be melted fixedly attached to said plug and projecting from the upper surface thereof, and electrode holder attaching means on the under side of said plug.

5. A device for initially closing the bottom of a crucible in an arc furnace for melting metallic consumable electrodes and acting as an electrode holder in a subsequent remelting operation comprising a plug adapted to close the bottom of a crucible, the upper portion of said plug comprising the stub of a previously melted electrode, said stub being welded to the lower portion of said plug, and electrode holder attaching means on the under side of said plug.

6. A device for initially closing the bottom of a crucible in an arc furnace for melting metallic consumable electrodes and acting as an electrode holder in a subsequent remelting operation comprising a plug having upper and lower portions of dissimilar metals adapted to close the bottom of a crucible, the upper portion of said plug comprising the stub of a previously melted electrode, said stub being welded to the lower portion of said plug, and electrode holder attaching means on the under side of said plug.

7. A device for initially closing the bottom of a crucible in an arc furnace for melting metallic consumable electrodes and acting as an electrode holder in a subsequent remelting operation comprising, a plug having upper and lower portions of dissimilar metal adapted to close the bottom of a crucible, the upper portion of said plugs comprising the stub of a previously melted electrode, said stub being welded to pins fixedly attached to the bottom portion of said plug, and electrode holder attaching means on the under side of said plug.

8. A device for initially closing the bottom of a crucible in an arc furnace for melting metallic consumable electrodes and to be used as an electrode holder in a subsequent remelting operation comprising, a plug of copper base metal adapted to close the bottom of the crucible, a plurality of pins of the metal being melted carried by the plug in spaced relation to one another and projecting outwardly from the upper surface of the plug, a mass of the previously melted metal being carried by said upper surface of the plug, said mass and the pins being welded together to rigidly secure the mass to the plug, and electrode holder attaching means disposed on the under side of the plug.

References Cited in the file of this patent
UNITED STATES PATENTS

| | | |
|---|---|---|
| Re. 10,082 | Billings | Apr. 11, 1882 |
| 2,187,720 | Williams | Jan. 23, 1940 |
| 2,541,764 | Herres et al. | Feb. 13, 1951 |